United States Patent
Ito et al.

(10) Patent No.: US 11,624,544 B2
(45) Date of Patent: Apr. 11, 2023

(54) DEHUMIDIFIER

(71) Applicant: Mitsubishi Electric Corporation, Tokyo (JP)

(72) Inventors: Shinichi Ito, Tokyo (JP); Fumitake Unezaki, Tokyo (JP); Mamoru Hamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1302 days.

(21) Appl. No.: 14/781,612

(22) PCT Filed: Apr. 24, 2013

(86) PCT No.: PCT/JP2013/062126
§ 371 (c)(1),
(2) Date: Oct. 1, 2015

(87) PCT Pub. No.: WO2014/174622
PCT Pub. Date: Oct. 30, 2014

(65) Prior Publication Data
US 2016/0018152 A1 Jan. 21, 2016

(51) Int. Cl.
*F25D 17/04* (2006.01)
*B01D 53/26* (2006.01)
(Continued)

(52) U.S. Cl.
CPC ....... *F25D 17/042* (2013.01); *B01D 53/0438* (2013.01); *B01D 53/261* (2013.01); *F24F 3/14* (2013.01); *F24F 11/65* (2018.01)

(58) Field of Classification Search
CPC . F25D 17/042; B01D 53/261; B01D 53/0438; F24F 3/14; F24F 11/65
See application file for complete search history.

(56) References Cited

U.S. PATENT DOCUMENTS 4,343,296 A * 8/1982 Franchina ........... F24D 11/0264
126/613
5,600,962 A * 2/1997 Aizawa .................. F24F 3/065
62/204
(Continued)

FOREIGN PATENT DOCUMENTS

CN 103889550 A 6/2014
JP 2001208393 A * 8/2001
(Continued)

OTHER PUBLICATIONS

Kinai, Deodorization Apparatus, Jul. 3, 2008, JP2008148832A, Whole Document.*

(Continued)

*Primary Examiner* — Larry L Furdge
(74) *Attorney, Agent, or Firm* — Posz Law Group, PLC

(57) ABSTRACT

A first heat exchanger, a desiccant block, and a second heat exchanger are arranged in series. In a dehumidifying operation, a first operation mode and a second operation mode are alternately repeated. In the first operation mode, the first heat exchanger is operated as a condensor or a radiator and the second heat exchanger is operated as an evaporator. In the second operation mode, the first heat exchanger is operated as the evaporator and the second heat exchanger is operated as the condensor or radiator. A pressure reducing amount in the first operation mode is controlled to be smaller than in the second operation mode so that a degree of superheat in the evaporator (second heat exchanger in the first operation mode, first heat exchanger in the second operation mode) in each of the first operation mode and the second operation mode is appropriately controlled to increase a dehumidifying amount.

18 Claims, 3 Drawing Sheets

(51) Int. Cl.
*B01D 53/04* (2006.01)
*F24F 3/14* (2006.01)
*F24F 11/65* (2018.01)

(56) References Cited

U.S. PATENT DOCUMENTS

| | | | | |
|---|---|---|---|---|
| 5,704,217 | A * | 1/1998 | Itoh | B60H 1/3207 236/49.3 |
| 6,364,942 | B1 * | 4/2002 | Felber | B01D 53/261 96/111 |
| 6,477,848 | B1 * | 11/2002 | Domyo | F25B 13/00 252/68 |
| 7,984,619 | B2 * | 7/2011 | Matsui | F24F 3/1411 62/271 |
| 2004/0003604 | A1 * | 1/2004 | So | F25B 13/00 62/156 |
| 2004/0134206 | A1 * | 7/2004 | Lee | F25B 13/00 62/157 |
| 2005/0011215 | A1 * | 1/2005 | Gu | F24F 1/022 62/324.1 |
| 2007/0193287 | A1 * | 8/2007 | Ishida | F24F 3/1411 62/176.1 |
| 2011/0126560 | A1 * | 6/2011 | Wightman | F25B 41/062 62/80 |
| 2014/0208783 | A1 * | 7/2014 | Lee | F25D 17/065 62/89 |
| 2014/0250930 | A1 | 9/2014 | Unezaki et al. | |

FOREIGN PATENT DOCUMENTS

| | | |
|---|---|---|
| JP | 2003-227626 A | 8/2003 |
| JP | 2006-150305 A | 6/2006 |
| JP | 2008-148832 A | 7/2008 |
| JP | 2008148832 A * | 7/2008 |
| JP | 2012-127630 A | 7/2012 |
| WO | 2013/061829 A1 | 5/2013 |

OTHER PUBLICATIONS

Mochizuki et al., Operation Controller for Air Conditioner, Aug. 3, 2001, JP2001208393A, Whole Document.*
The American Heritage Dictionary, available at www.ahdictionary.com (Exhibit A).*
Office Action dated Apr. 27, 2016 in the corresponding CN application No. 201380075910.X (with English translation).
Office Action dated Nov. 18, 2016 issued in corresponding CN patent application No. 201380075910.X (and English translation).
Office Action dated Mar. 28, 2018 issued in corresponding IN patent application No. 6972/CHENP/2015.
International Search Report of the International Searching Authority dated Aug. 6, 2013 for the corresponding international application No. PCT/JP2013/062126 (and English translation).
Office Action dated May 12, 2017 issued in corresponding CN patent application No. 201380075910.X (and English translation).
Extended European Search Report dated Nov. 3, 2016 issued in corresponding EP patent application No. 13882663.1.
Office Action dated Oct. 15, 2015 in the corresponding TW application No. 102127046 (with English translation).

* cited by examiner

DEHUMIDIFIER

CROSS REFERENCE TO RELATED APPLICATION

This application is a U.S. national stage application of International Application No. PCT/JP2013/062126 filed on Apr. 24, 2013, the disclosure of which is incorporated herein by reference.

TECHNICAL FIELD

The present invention relates to a dehumidifier.

BACKGROUND ART

Hitherto, there has been known an example of Patent Literature 1 as a dehumidifier for dehumidifying space to be dehumidified through adsorption and desorption by a desiccant material for adsorbing and desorbing moisture. Patent Literature 1 relates to a technology of performing dehumidification while combining cooling and heating by a heat exchanger in a refrigeration cycle and adsorption and desorption by a desiccant rotor. The dehumidifier in Patent Literature 1 has an air passage for causing air in the space to be dehumidified to sequentially flow through a radiator in the refrigeration cycle, a desorption portion of the desiccant rotor, an evaporator in the refrigeration cycle, and an adsorption portion of the desiccant rotor.

The air, which has been taken from the space to be dehumidified into the air passage, is heated in the radiator. The heated air is humidified in the desorption portion of the desiccant rotor. The humidified air is cooled down to a dew-point temperature or less in the evaporator to be cooled and dehumidified. The cooled and dehumidified air is further dehumidified in the adsorption portion of the desiccant rotor, and then is returned to the space to be dehumidified. Further, a dehumidifying operation is continuously performed by rotating the desiccant rotor.

CITATION LIST

Patent Literature

Patent Literature 1: Japanese Unexamined Patent Application Publication No. 2006-150305 (Abstract, FIG. 1)

SUMMARY OF INVENTION

Technical Problem

In the above-mentioned related-art apparatus, adsorption and desorption actions of the desiccant material and cooling and heating actions of the refrigeration cycle are combined with each other so that a larger dehumidifying amount can be realized than in a case of dehumidification using only the refrigeration cycle or the desiccant material, thereby providing a dehumidifier having high performance. On the other hand, the above-mentioned related-art apparatus, however, has the following problems.

The desiccant rotor is used, and hence a drive unit for the rotor is necessary. Further, it is necessary to provide a sealing structure for separating boundary portions of the adsorption portion and the desorption portion of the desiccant rotor in an air-tight manner to prevent air leakage between the adsorption portion and the desorption portion, thus leading to a problem in increase in size of the apparatus and cost. Further, an air-passage structure in which the air having passed through the desiccant rotor is again returned to the desiccant rotor is employed, and hence the air-passage structure has a large number of curved portions, thus leading to a problem in that a pressure loss at the time of sending the air is increased so that power of a fan is increased to increase power consumption of the apparatus.

The present invention has been made to solve the above-mentioned problems, and has an object to realize a dehumidifier that is capable of simplifying the apparatus while keeping high dehumidification performance by eliminating the need for a desiccant-rotor drive unit or a sealing structure for boundary portions of an adsorption portion and a desorption portion to attain compactification and low cost.

Solution to Problem

The present invention provides a dehumidifier including a refrigerant circuit configured to circulate refrigerant and sequentially connecting a compressor, a flow switching device, a first heat exchanger, a pressure reducing unit, and a second heat exchanger to each other by refrigerant pipes, an air passage in which the first heat exchanger, a desiccant material capable of adsorbing and desorbing moisture, and the second heat exchanger are arranged in series, and an air-sending device arranged in the air passage and configured to cause air existing in space to be dehumidified to flow through the air passage. The dehumidifier is configured to perform a dehumidifying operation including a first operation mode in which the first heat exchanger is operated as a condensor or a radiator and the second heat exchanger is operated as an evaporator to desorb the moisture retained in the desiccant material, and a second operation mode in which the first heat exchanger is operated as the evaporator and the second heat exchanger is operated as the condensor or the radiator to cause the desiccant material to adsorb moisture from air passing through the air passage. The first operation mode and the second operation mode are alternately switched through switching of a flow passage by the flow switching device. The dehumidifying operation is performed so that a pressure reducing amount in the pressure reducing unit in the first operation mode is smaller than a pressure reducing amount in the pressure reducing unit in the second operation mode.

Advantageous Effects of Invention

According to the present invention, the adsorption and desorption actions of the desiccant material and the heating and cooling actions obtained through performance of the refrigeration cycle in the refrigerant circuit are combined with each other so that dehumidification of a high dehumidifying amount can be performed. In addition, an air-passage structure in which the first heat exchanger, the desiccant material, and the second heat exchanger are arranged in series is employed. Further, the dehumidification is performed by alternately switching the first operation mode and the second operation mode through the switching of the flow passage by the flow switching device. In the first operation mode, the first heat exchanger is operated as the condensor or the radiator and the second heat exchanger is operated as the evaporator to desorb the moisture retained in the desiccant material. In the second operation mode, the first heat exchanger is operated as the evaporator and the second heat exchanger is operated as the condensor or the radiator to cause the desiccant material to adsorb the moisture from the air passing through the air passage. Consequently, the apparatus structure can be further simplified to provide an apparatus that is more compact and low cost. Further, the pressure reducing amount in the pressure reducing unit in the first operation mode is controlled to be smaller than that in the second operation mode so that a degree of superheat can appropriately be controlled in each of the first operation mode and the second operation mode to increase the dehumidifying amount.

DESCRIPTION OF EMBODIMENTS

Embodiment 1

Figure 1:
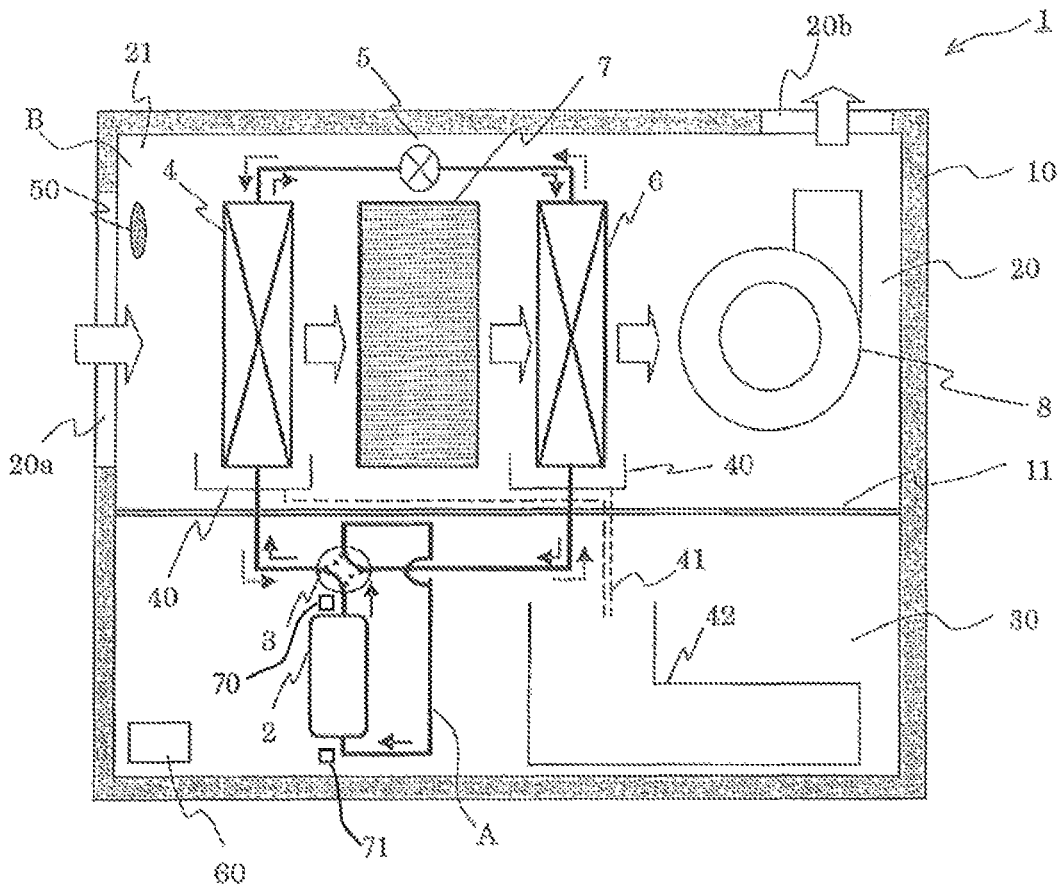
FIG. 1 is a diagram illustrating a configuration of a dehumidifier according to Embodiment 1 of the present invention.

FIG. 1 is a diagram illustrating a configuration of a dehumidifier according to Embodiment 1 of the present invention. In FIG. 1 and each drawing described later, components denoted by the same reference signs correspond to the same or equivalent components. This is common throughout the description herein. Further, the forms of the components described herein are merely examples, and the components are not limited to those described herein.

A dehumidifier 1 includes, in a housing 10, a compressor 2, a four-way valve 3 serving as a flow switching device, a first heat exchanger 4, a pressure reducing unit 5 changeable in resistance (pressure reducing amount) between two levels or more, and a second heat exchanger 6. These components are annularly connected to each other by refrigerant pipes to construct a refrigerant circuit A. An inside of the housing 10 is partitioned into an air passage chamber 20 and a machine chamber 30. The compressor 2 and the four-way valve 3 are arranged in the machine chamber 30, and components other than the compressor 2 and the four-way valve 3 are arranged in the air passage chamber 20. Note that, through holes (not shown) are formed in a wall surface 11 partitioning the machine chamber 30 and the air passage chamber 20, and the refrigerant pipes are inserted through the through holes (not shown) so that the respective components are connected to each other. Further, to prevent generation of an air flow between the machine chamber 30 and the air passage chamber 20 through gaps between the through holes and the connection pipes, it is preferred that no gap portions be formed to maintain air tightness.

The four-way valve 3 is configured to switch a flow passage so that refrigerant flows in a direction of the solid lines in FIG. 1 or a direction of the dotted lines in FIG. 1. When the flow passage is switched to a flow passage indicated by the solid lines in FIG. 1, a refrigeration cycle is constructed that the refrigerant, which is discharged from the compressor 2, sequentially flows through the four-way valve 3, the first heat exchanger 4, the pressure reducing unit 5 set to a first resistance (pressure reducing amount), the second heat exchanger 6, and the four-way valve 3 to return to the compressor 2. In this configuration, the first heat exchanger 4 is operated as a condensor (radiator), and the second heat exchanger 6 is operated as an evaporator.

On the other hand, when the flow passage of the four-way valve 3 is switched to a flow passage indicated by the dotted lines in FIG. 1, a refrigeration cycle is constructed that the refrigerant, which is discharged from the compressor 2, sequentially flows through the compressor 2, the four-way valve 3, the second heat exchanger 6, the pressure reducing unit 5 set to a second resistance (pressure reducing amount), the first heat exchanger 4, and the four-way valve 3 to return to the compressor 2. In this configuration, the second heat exchanger 6 is operated as the condensor (radiator), and the first heat exchanger 4 is operated as the evaporator. As the refrigerant for the dehumidifier 1, for example, R410A is used. Note that, the refrigerant is not limited to R410A, and another HFC-based refrigerant, a HC refrigerant, or a natural refrigerant such as $CO_2$ or $NH_3$ can be used. When the $CO_2$ refrigerant is used in an operation with a high pressure being a critical pressure or more, the condensor is operated as the radiator.

The first heat exchanger 4 and the second heat exchanger 6 are each a plate fin tube heat exchanger, and are each configured to exchange heat between refrigerant flowing in a heat transfer tube and air flowing around fins. Further, the pressure reducing unit 5 is an electronic expansion valve that is variably controllable in its opening degree and changeable in resistance (pressure reducing amount).

The air passage chamber 20 includes an air inlet 20a for introducing air to be dehumidified to an inside, and an air outlet 20b for exhausting the dehumidified air to an outside. The air, which is sent by a fan 8 serving as an air-sending device, flows in a direction of the outline arrows in FIG. 1. The air passage chamber 20 is formed into a rectangular shape. The air passage chamber 20 has formed therein an air passage B in which the first heat exchanger 4, a desiccant block 7 serving as a desiccant material, the second heat exchanger 6, and the fan 8 are arranged in series. Therefore, the air, which is sucked from the air inlet 20a into the air passage B, flows linearly through the air passage B in the order of the first heat exchanger 4, the desiccant block 7 serving as the desiccant material, the second heat exchanger 6, and the fan 8, and is then exhausted from the air outlet 20b to the outside of the dehumidifier 1.

The desiccant block 7 is obtained by forming a desiccant material into a solid in a rectangular shape. The desiccant block 7 is formed of a material that adsorbs and desorbs moisture, and, for example, zeolite, silica gel, or polymer-based adsorbent is used.

Further, in the air passage chamber 20, a drain pan 40 is arranged below each of the first heat exchanger 4 and the second heat exchanger 6. The drain pan 40 receives drain water that is generated during the operation and drops from each heat exchanger. The drain water, which is received in the drain pan 40, flows through a water passage 41 indicated by the dotted lines in FIG. 1 into a drain tank 42, which is arranged in a lowermost portion in the dehumidifier 1, to be stored.

The air passage chamber 20 further includes a temperature-humidity sensor 50 for measuring a temperature and a humidity of air sucked into the dehumidifier 1 (temperature and humidity around the dehumidifier 1).

Further, the dehumidifier 1 further includes a controller 60 on the machine chamber 30 side, for controlling the entire dehumidifier 1. The controller 60 is constructed by a microcomputer, and includes a CPU, a RAM, and a ROM. A control program is stored in the ROM. The controller 60 performs various types of control such as control of a dehumidifying operation (such as switching of the four-way valve 3 in accordance with a detection signal of the temperature-humidity sensor 50) described later, control of the rotation speed of the fan 8, control of the rotation speed of the compressor 2, and control of the opening degree of the pressure reducing unit 5.

Next, the dehumidifying operation performance of the dehumidifier 1 is described. The dehumidifying operation includes a first operation mode and a second operation mode, and is an operation of dehumidifying the air to be dehumidified by switching the first operation mode and the second operation mode through switching of the flow passage by the four-way valve 3. Each of the operation modes is hereinafter described in order.

(First Operation Mode: Performance of Refrigeration Cycle)

First, performance of the first operation mode, which corresponds to a case where the flow passage of the four-way valve 3 is switched to the solid lines in FIG. 1, is described. The performance of the refrigeration cycle in the first operation mode is as follows. A low-pressure gas is sucked by the compressor 2, and is then compressed into a high-temperature and high-pressure gas. The refrigerant discharged by the compressor 2 passes through the four-way valve 3 into the first heat exchanger 4. The refrigerant that flows into the first heat exchanger 4 rejects heat to air flowing in the air passage B, and the refrigerant itself is cooled while heating the air to be condensed into high-pressure liquid refrigerant and flows out of the first heat exchanger 4. The liquid refrigerant that flows out of the first heat exchanger 4 is reduced in pressure into low-pressure two-phase refrigerant by the pressure reducing unit 5 set to the first resistance (pressure reducing amount). After that, the refrigerant flows into the second heat exchanger 6 and takes away heat from the air flowing in the air passage B, and the refrigerant itself is heated while cooling the air to be evaporated into a low-pressure gas. After that, the refrigerant passes through the four-way valve 3 and is sucked into the compressor 2.

(First Operation Mode: Performance of Air)

Figure 2:
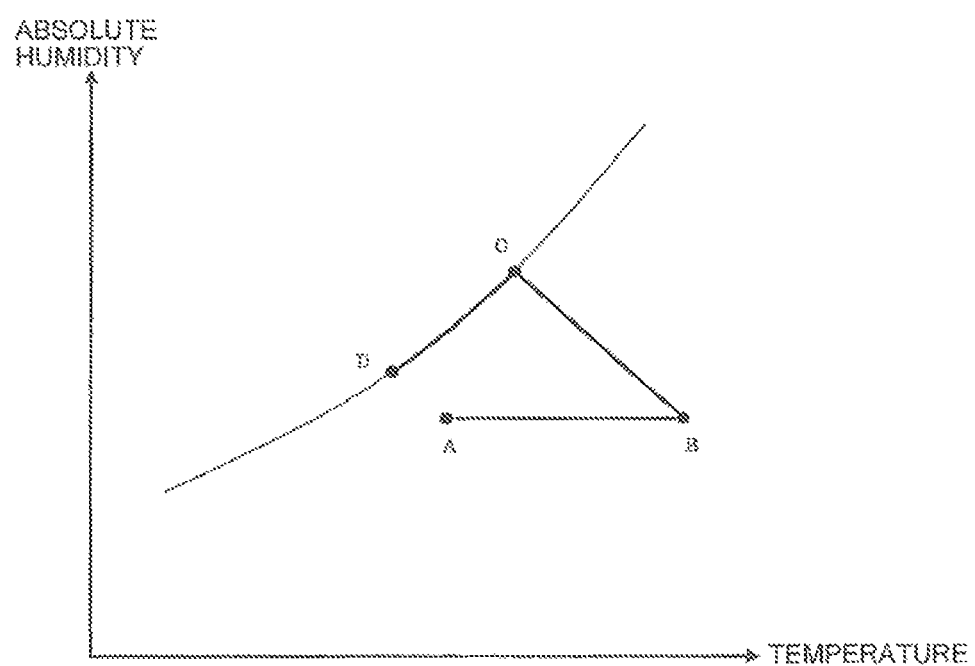
FIG. 2 is a psychrometric chart illustrating state change of air in a first operation mode.

Next, performance of air in the first operation mode is described referring to FIG. 2. FIG. 2 is a psychrometric chart illustrating state change of the air in the first operation mode. The vertical axis represents an absolute humidity of the air, and the horizontal axis represents a dry-bulb temperature of the air. Further, the curved line in FIG. 2 represents saturated air, and a relative humidity of the saturated air is 100%.

After flowing into the dehumidifier 1, the air around the dehumidifier 1 (FIG. 2, point A) is heated in the first heat exchanger 4 so that a temperature thereof is increased and a relative humidity thereof is decreased (FIG. 2, point B). After that, the air flows into the desiccant block 7. The relative humidity of the air is low, and hence moisture retained in the desiccant block 7 is desorbed (released) so that an amount of moisture contained in the air is increased. On the other hand, desorption heat is taken due to the desorption from the air that flows into the desiccant block 7 so that the temperature of the air is decreased to be brought into a low-temperature and high-humidity state (FIG. 2, point C). After that, the air flows into the second heat exchanger 6 and is cooled. Note that, the refrigerant circuit A is operated so that a refrigerant temperature in the second heat exchanger 6 is lower than a dew-point temperature of the air, and the air is cooled and dehumidified by the second heat exchanger 6 to be brought into a low-temperature and low-absolute humidity state (FIG. 2, point D). After that, the air flows into the fan 8 and is exhausted from the air outlet 20b to the outside of the dehumidifier 1.

(Second Operation Mode: Performance of Refrigeration Cycle)

Next, performance of the second operation mode, which corresponds to a case where the flow passage of the four-way valve 3 is switched to the dotted lines in FIG. 1, is described. The performance of the refrigeration cycle in the second operation mode is as follows. A low-pressure gas is sucked by the compressor 2, and is then compressed into a high-temperature and high-pressure gas. The refrigerant discharged by the compressor 2 passes through the four-way valve 3 into the second heat exchanger 6. The refrigerant that flows into the second heat exchanger 6 rejects heat to air flowing in the air passage B, and the refrigerant itself is cooled while heating the air to be condensed into high-pressure liquid refrigerant and flows out of the second heat exchanger 6. The liquid refrigerant that flows out of the second heat exchanger 6 is reduced in pressure into low-pressure two-phase refrigerant by the pressure reducing unit 5 having its opening degree adjusted to the second resistance (pressure reducing amount). After that, the refrigerant flows into the first heat exchanger 4 and takes away heat from the air flowing in the air passage B, and the refrigerant itself is heated while cooling the air to be evaporated into a low-pressure gas. After that, the refrigerant passes through the four-way valve 3 and is sucked into the compressor 2.

(Second Operation Mode: Performance of Air)

Figure 3:
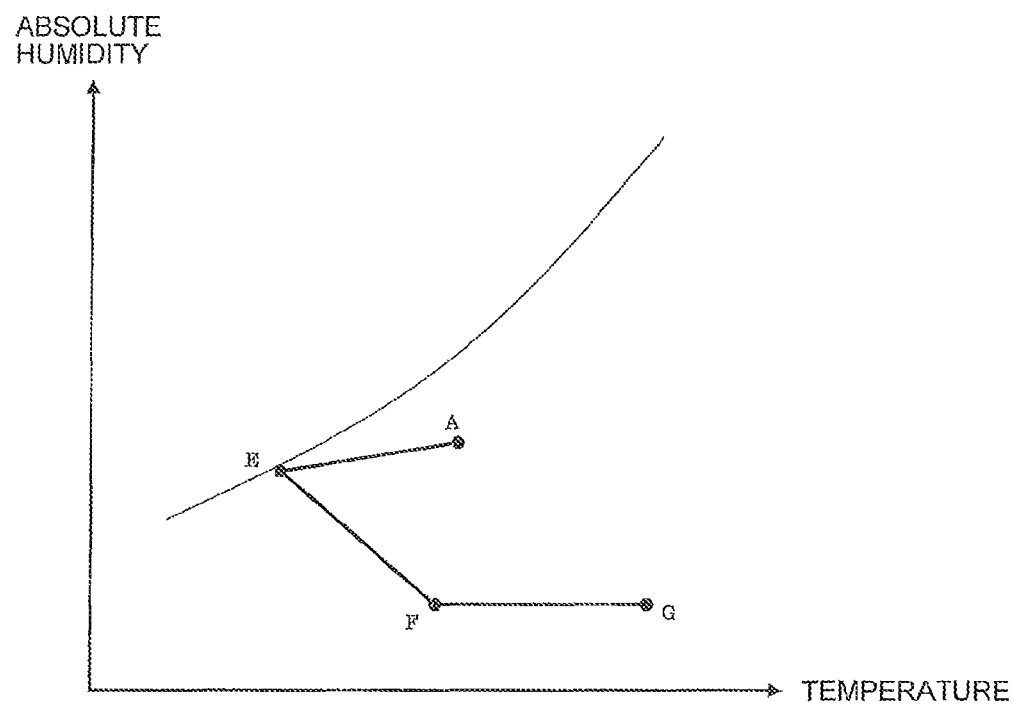
FIG. 3 is a psychrometric chart illustrating state change of air in a second operation mode.

Next, performance of air in the second operation mode is described referring to FIG. 3. FIG. 3 is a psychrometric chart illustrating state change of the air in the second operation mode. The vertical axis represents an absolute humidity of the air, and the horizontal axis represents a dry-bulb temperature of the air. Further, the curved line in FIG. 3 represents saturated air, and a relative humidity of the saturated air is 100%.

After flowing into the dehumidifier 1, the air around the dehumidifier 1 (FIG. 3, point A) is cooled in the first heat exchanger 4. Note that, the refrigerant circuit A is operated so that a refrigerant temperature in the first heat exchanger 4 is lower than the dew-point temperature of the air, and the air is cooled and dehumidified by the first heat exchanger 4 to be brought into a low-temperature and high-relative humidity state (FIG. 3, point E). After that, the air flows into the desiccant block 7. The relative humidity of the air is high, and hence moisture is adsorbed into the desiccant block 7 so that an amount of moisture contained in the air is decreased to be further dehumidified. On the other hand, the air that flows into the desiccant block 7 is heated by adsorption heat generated along with the adsorption so that the temperature of the air is increased to be brought into a high-temperature and low-humidity state (FIG. 3, point F). After that, the air flows into the second heat exchanger 6 and is heated to increase its temperature (FIG. 3, point G). After that, the air flows into the fan 8 and is exhausted from the air outlet 20b to the outside of the dehumidifier 1.

As described above, in the first operation mode, the dehumidification by the adsorption of the desiccant block 7 is performed in addition to the dehumidification by the cooling by the refrigerant in the first heat exchanger 4. Therefore, as apparent from comparison between FIG. 2 and FIG. 3, a larger dehumidifying amount can be secured in the second operation mode than that in the first operation mode, and hence the dehumidification in the dehumidifier 1 is mainly performed in the second operation mode.

Further, comparing relative humidities between the air flowing into the second heat exchanger 6 that functions as the evaporator in the first operation mode (FIG. 2, point C) and the air flowing into the first heat exchanger 4 that functions as the evaporator in the second operation mode (FIG. 3, point A), the relative humidity is higher at the point C in FIG. 2. Therefore, a resistance (pressure reducing amount) in the pressure reducing unit 5 that is required to maximize the dehumidifying amount in each of the operation modes differs between the respective operation modes. In particular, the point C in FIG. 2 in the first operation mode is high in humidity, and hence even when a difference between an evaporation temperature and a temperature of passing air is small, the dehumidification can be performed. Therefore, in the first operation mode, through setting of the resistance (pressure reducing amount) in the pressure reducing unit 5 smaller than that in the second operation mode for improvement of efficiency of the refrigeration cycle, a larger dehumidifying amount can be secured. On the other hand, in the second operation mode, through setting of the resistance (pressure reducing amount) in the pressure reducing unit 5 larger than that in the second operation mode, a required dehumidifying amount is secured.

Figure 4:
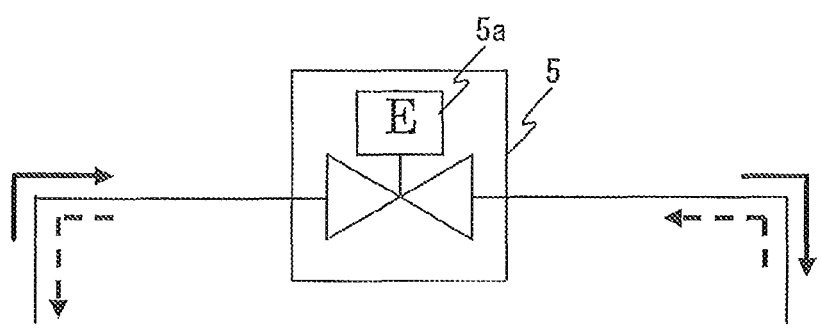
FIG. 4 is a diagram illustrating a pressure reducing unit in FIG. 1.

FIG. 4 is a diagram illustrating the pressure reducing unit in FIG. 1. The solid lines in FIG. 4 indicate the flow of the refrigerant in the first operation mode, and the dotted lines indicate the flow of the refrigerant in the second operation mode.

The pressure reducing unit 5 is herein constructed by an electronic expansion valve 5a as described above. Through adjustment of the opening degree of the electronic expansion valve 5a, the resistance (pressure reducing amount) in the pressure reducing unit 5 is caused to differ between the first operation mode and the second operation mode. Specifically, when the first operation mode is switched to the second operation mode, the opening degree of the pressure reducing unit 5 is reduced to increase the pressure reducing amount, and when the second operation mode is switched to the first operation mode, the opening degree of the pressure reducing unit 5 is increased to reduce the pressure reducing amount.

In the dehumidifier 1 according to Embodiment 1, the first and second operation modes are alternately repeated. For example, when the second operation mode is performed continuously, because there is a limit to the amount of the moisture containable in the desiccant block 7, through an operation for a certain time period, the moisture is not adsorbed into the desiccant block 7 anymore, thereby decreasing the dehumidifying amount. To address the problem, in a stage in which the amount of the moisture retained in the desiccant block 7 is closer to the upper limit, the second operation mode is switched to the first operation mode, and an operation of releasing the moisture from the desiccant block 7 is performed. The first operation mode is performed for a while, and the amount of the moisture retained in the desiccant block 7 is moderately reduced. At this time point, the first operation mode is switched to the second operation mode again. As described above, the first and second operation modes are performed alternately so that the adsorption and desorption actions of the desiccant block 7 are performed sequentially, thereby maintaining an effect of increasing the dehumidifying amount due to the adsorption and desorption actions of the desiccant.

As described above, in Embodiment 1, the air passage B is formed linearly to construct a dehumidifier 1 having high performance, in which the adsorption and desorption actions of the desiccant material and the heating and cooling actions of the refrigeration cycle are combined with each other. The related-art apparatus has a configuration using a desiccant rotor, and hence it is required to cause air to pass through an adsorption portion and a desorption portion of the desiccant rotor. Thus, it is inevitable to form an air passage having a curved portion, and a pressure loss at the time of sending the air is correspondingly increased. In contrast, in Embodiment 1, the air passage B is formed linearly, and hence the pressure loss at the time of sending the air can be reduced. Therefore, power consumption of the fan 8 for sending air can be correspondingly reduced to obtain a more highly efficient apparatus.

Further, the resistance (pressure reducing amount) in the pressure reducing unit 5 is caused to differ between the first operation mode and the second operation mode, and as described above, the resistance (pressure reducing amount) in the pressure reducing unit 5 in the first operation mode is set smaller than that in the second operation mode, thereby enabling construction of a refrigeration cycle to maximize the dehumidifying amount in each of the operation modes. Therefore, in each of the first operation mode and the second operation mode, a degree of superheat in the evaporator (second heat exchanger 6 in the first operation mode, first heat exchanger 4 in the second operation mode) is appropriately controlled, thereby enabling increase in the dehumidifying amount.

In the configuration using the desiccant rotor in the related art, a motor for rotationally driving the desiccant rotor, a fixing structure therefor, and the like are necessary, thereby complicating an apparatus configuration. In contrast, in Embodiment 1, the desiccant block 7 is stationary. Thus, the motor for rotationally driving the desiccant material is unnecessary, and further, the air passage configuration is simple. Therefore, compactification can be achieved, and the apparatus configuration can be simplified to provide a low-cost apparatus.

Further, in Embodiment 1, the air passage B is formed into a rectangular shape. Therefore, when each of the first heat exchanger 4, the second heat exchanger 6, and the desiccant block 7, which are to be mounted in the air passage B, is formed to have a rectangular outer-shape structure in conformity with the shape of the air passage B, each of the components can be mounted in the rectangular air passage B in higher density.

That is, in the related-art apparatus, the desiccant rotor is used, and hence the circular rotor is arranged in the rectangular air passage B. Therefore, dead space is generated in each of four corners in a rotor arrangement portion, and hence the air passage cannot be formed compact. In contrast, in Embodiment 1, the rectangular desiccant block 7 is used, and hence can be arranged without the dead space, thereby achieving mounting in high density. As a result, the air passage B can be formed compact (the air passage chamber 20 can be formed compact).

Further, in the related-art apparatus, the air passage needs to be divided for each of the adsorption portion and the desorption portion, thereby requiring a sealing structure for separating boundary portions of the adsorption portion and the desorption portion in an air-tight manner. In contrast, in Embodiment 1, the single air passage B is formed, and through the switching of the four-way valve 3, the adsorption and the desorption of the desiccant block 7 can be switched. Thus, the sealing structure in the related art is unnecessary, and the apparatus configuration can be simplified to achieve cost reduction.

Note that, when each of the first heat exchanger 4, the second heat exchanger 6, and the desiccant block 7, which are to be mounted in the air passage B, is formed to have the structure with the rectangular outer shape in conformity with the shape of the air passage B as described above, an effect of the compactification can be obtained as described above, and hence the structure with the rectangular outer shape is preferred. However, the shape of the structure is not necessarily limited to the rectangular shape.

Further, in the second operation mode in this embodiment, the sent air is subject to the heating by the second heat exchanger 6 subsequently to the dehumidification by the first heat exchanger 4 and the dehumidification by the desiccant block 7. Therefore, the air blown from the dehumidifier 1 is high in temperature with a small amount of moisture (FIG. 3, point G), and a relative humidity thereof can be decreased to a low relative humidity of, for example, 20% or less. The air having the low relative humidity as described above is air suitable for drying use, and when the air is directly blown onto an object to be dried such as a laundry, drying of the object to be dried can be promoted, thereby realizing a drying function having higher performance.

Note that, the blown air in the first operation mode is lower in temperature and higher in humidity than the blown air in the second operation mode, and hence, when using the dehumidifier 1 to dry the object to be dried, it is desired that the blown air be blown onto the object to be dried only in the second operation mode. Therefore, to correspond to such use, vanes changeable in air blowing direction may be arranged in the air outlet 20b of the dehumidifier 1 to achieve a configuration adjustable between a blowing direction in the first operation mode and a blowing direction in the second operation mode that are different from each other. Further, the vanes only need to be adjusted so that the air blown from the air outlet 20b is blown onto the object to be dried only in the second operation mode. Consequently, the drying of the object to be dried can further be promoted, thereby realizing a drying function having high performance.

Note that, the dehumidifier according to the present invention is not limited to the above-mentioned configuration, and various modifications may be made without departing from the gist of the present invention as follows, for example.

Modification Example 1

Components of Dehumidifier 1

In FIG. 1, the configuration using the four-way valve 3 to switch the refrigerant circuit A is illustrated. However, as long as a configuration capable of switching the flow passage in the refrigerant circuit A is used, the configuration is not limited to the one using the four-way valve, and another valve may be used. For example, there may be employed a configuration in which four two-way solenoid valves are used, and the solenoid valves are respectively arranged in portions connecting between a discharge side of the compressor 2 and the first heat exchanger 4 and a suction side of the compressor 2 and the first heat exchanger 4. In this manner, through opening and closing of each of the solenoid valves, a refrigerant circuit A and a refrigeration cycle, which are similar to those in this embodiment, may be realized.

Modification Example 2

Configuration of Pressure Reducing Unit 5

In the above, an example in which the pressure reducing unit 5 is constructed by the electronic expansion valve 5a is described. However, various pressure reducing units are conceivable as the pressure reducing unit 5.

Figure 5:
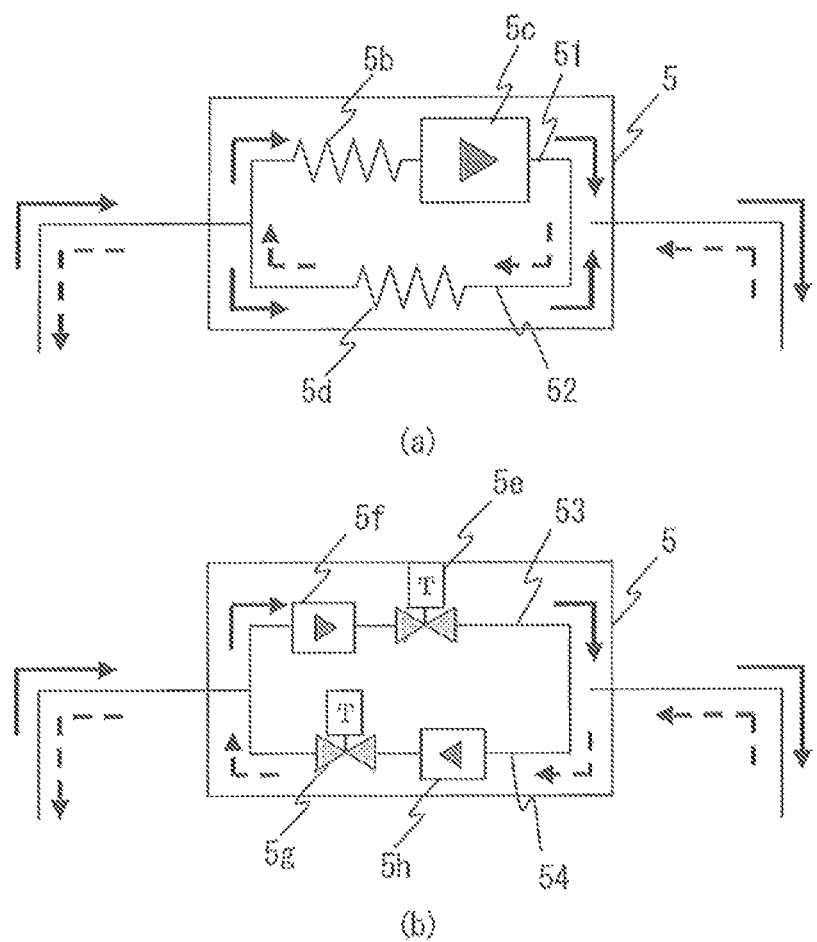
FIG. 5 is diagrams each illustrating a modification example of the pressure reducing unit in FIG. 1.

FIG. 5 is diagrams each illustrating a modification example of the pressure reducing unit in FIG. 1. The solid arrows in FIG. 5 indicate the flow of the refrigerant in the first operation mode, and the dotted arrows in FIG. 5 indicate the flow of the refrigerant in the second operation mode.

The pressure reducing unit 5 in FIG. 5 (a) has a configuration in which a first flow passage 51 and a second flow passage 52 are connected in parallel. In the first flow passage 51, a first element 5b and a second element 5c are arranged in series. The first element 5b is constructed by a capillary tube or an expansion valve fixed in its opening degree. The second element 5c is constructed by a check valve or an openable/closable valve for causing refrigerant to flow through the first element 5b of the first flow passage 51 only in the first operation mode. Further, a third element 5d constructed by a check valve or an openable/closable valve is arranged in the second flow passage 52.

With the configuration as described above, in the first operation mode, as indicated by the solid arrows, the refrigerant flows through both the first flow passage 51 and the second flow passage 52 while being reduced in pressure by the first element 5b and the third element 5d. On the other hand, in the second operation mode, as indicated by the dotted arrows, the refrigerant flows only on the second flow passage 52 side, and is reduced in pressure in the second flow passage 52 by the third element 5d. With this configuration, the resistance (pressure reducing amount) in the first operation mode is smaller than that in the second operation mode.

The pressure reducing unit 5 in FIG. 5 (b) has a configuration in which a first flow passage 53 and a second flow passage 54 are connected in parallel. In the first flow passage 53, a first element 5e and a second element 5f are arranged in series. The first element 5e is constructed by a thermal expansion valve. The second element 5f is constructed by a check valve or an openable/closable valve for causing refrigerant to flow through the first element 5e of the first flow passage 53 only in the first operation mode. Further, in the second flow passage 54, a third element 5g and a fourth element 5h are arranged in series. The third element 5g is constructed by a thermal expansion valve. The fourth element 5h is constructed by a check valve or an openable/closable valve for causing refrigerant to flow through the third element 5g of the second flow passage 54 only in the second operation mode.

In this configuration, the first element (thermal expansion valve) 5e in the first flow passage 53 is controlled in its opening degree based on a temperature difference between an inlet and an outlet of the second heat exchanger 6 that serves as the evaporator in the first operation mode, and the third element (thermal expansion valve) 5g in the second flow passage 54 is adjusted in its opening degree based on a temperature difference between an inlet and an outlet of the first heat exchanger 4 that serves as the evaporator in the second operation mode. With this configuration, the resistance (pressure reducing amount) in the first operation mode can be set smaller than that in the second operation mode.

Further, although not illustrated, a combination of the elements or the like may be employed. In any case, the pressure reducing unit 5 only needs to be constructed such that the resistance (pressure reducing amount) in the first operation mode is smaller than that in the second operation mode.

In Embodiment 1 according to the present invention, the pressure reducing unit 5 is constructed such that the pressure reducing amount in the first operation mode is smaller than that in the second operation mode. However, as long as the same effect can be obtained, a different index may be set as a reference.

For example, through control of the pressure reducing unit 5 so that the cross-sectional area (opening degree) of the refrigerant flow passage when the refrigerant passes through the pressure reducing unit 5 is larger in the first operation mode than that in the second operation mode, the pressure reducing amount is smaller in the first operation mode, thereby obtaining the same effect.

Further, through control in the following items (1) to (4), the same control can be performed.

(1) Although not illustrated, the pressure reducing unit 5 is controlled so that a refrigerant-saturation temperature in the second heat exchanger 6 in the first operation mode is higher than a refrigerant-saturation temperature in the first heat exchanger 4 in the second operation mode (it is necessary to reduce the pressure reducing amount to increase the saturation temperature).

(2) The pressure reducing unit 5 is controlled to reduce a difference between a temperature difference between a refrigerant temperature in a suction portion of the compressor 2 and a refrigerant-saturation temperature in the second heat exchanger 6 in the first operation mode, and a temperature difference between a refrigerant temperature in the suction portion of the compressor 2 and a refrigerant-saturation temperature in the first heat exchanger 4 in the second operation mode (when a difference in degree of suction superheat between the modes is small, the pressure reducing amount is determined depending on the air flowing into the evaporator, and the pressure reducing amount in the first operation mode in which an enthalpy of the flowing air is high is reduced).

(3) The pressure reducing unit 5 is controlled to reduce a difference in discharge temperature in the compressor 2 between the first operation mode and the second operation mode (also when the difference in discharge temperature between the modes is small, the pressure reducing amount is determined depending on the air flowing into the evaporator).

(4) The pressure reducing unit 5 is controlled to reduce a difference between a temperature difference between the refrigerant-saturation temperature in the first heat exchanger 4 and a refrigerant temperature in an outlet of the first heat exchanger 4 in the first operation mode, and a temperature difference between the refrigerant-saturation temperature in the second heat exchanger 6 and a refrigerant temperature in an outlet of the second heat exchanger 6 in the second operation mode (when controlling the pressure reducing unit 5 to reduce a difference in degree of subcooling in the condensor between the modes, the pressure reducing amount is determined depending on the air flowing into the evaporator).

Modification Example 3

Operation Time Period of Each of Operation Modes

An operation time period of each of the first operation mode and the second operation mode may be a preset time period. However, the operation time period of each of the operation modes has an appropriate value in accordance with a condition of air or an operation state of the dehumidifier 1. Therefore, the operation time period of each of the operation modes may be determined based on the condition of air or the operation state of the dehumidifier 1 so that the dehumidifier 1 can be operated at the appropriate value.

In the first operation mode, the moisture is released from the desiccant block 7, and hence the appropriate value corresponds to a time period required to release a moderate amount of the moisture from the desiccant block 7 so that an amount of the moisture that remains in the desiccant block 7 becomes an appropriate amount. When the first operation mode is ended and switched to the second operation mode in a state in which the amount of the moisture that remains in the desiccant block 7 is larger than the appropriate amount, an amount of the moisture that can be adsorbed by the desiccant block 7 in the second operation mode is suppressed to reduce the dehumidifying amount in the second operation mode. In contrast, when the first operation mode is performed for an excessively long period of time, a state in which the moisture is hardly desorbed from the desiccant block 7 continues in a latter stage in the first operation mode, and hence the switching to the second operation mode that realizes the higher dehumidifying amount than that in the first operation mode is delayed. Therefore, the dehumidifying amount in total is reduced also in this case.

In the second operation mode, the moisture is adsorbed into the desiccant block 7, and hence an appropriate value corresponds to a time period until an amount of the moisture adsorbed into the desiccant block 7 becomes an appropriate amount. When the operation is switched to the first operation mode even when the desiccant block 7 still has room to adsorb the moisture, the operation time period of the second operation mode having the higher dehumidifying amount than the first operation mode is shortened so that the dehumidifying amount is reduced in total. In contrast, when the second operation mode is performed for an excessively long period of time, a state in which the desiccant block 7 cannot adsorb the moisture continues in a latter stage in the second operation mode, and hence the dehumidifying amount is reduced also in this case.

The change in amount of the moisture retained in the desiccant block 7 is determined in accordance with a relative humidity of air flowing into the desiccant block 7, and when air having a high relative humidity flows into the desiccant block 7, the moisture in the desiccant block 7 is less easily released to increase an amount of the adsorbed moisture contrarily. Further, when the air having the low relative humidity flows into the desiccant block 7, the moisture in the desiccant block 7 is easily released to reduce the amount of the adsorbed moisture contrarily.

In view of the above-mentioned matters, the operation time period of each of the operation modes may be determined by Determination Method 1 or Determination Method 2 below. Incidentally, during the dehumidifying operation, the first operation mode and the second operation mode are performed as one cycle, and this cycle is performed repeatedly. A time period of the one cycle (that is, a total time period of the operation time period of the first operation mode and the operation time period of the second operation mode) is always the same. Therefore, the determination methods described below in a sense determine a time distribution in the one cycle between the first operation mode and the second operation mode. Note that, the determination of each operation time period is made at the start of the dehumidifying operation. Each determination pattern is described below in order.

(Determination Method 1)

A relative humidity of the sucked air is determined based on a state of the sucked air, which is obtained by the temperature-humidity sensor 50, and then the operation time period of each of the operation modes is determined in accordance with the relative humidity. Specific description is given below.

A relative humidity of the sucked air, which serves as a reference (hereinafter referred to as "reference relative humidity"), is predetermined, and a reference operation time period of each of the operation modes that a high dehumidifying amount can be obtained when sucked air having the reference relative humidity passes through the air passage B is predetermined through experiments, simulation, or the like. Then, the reference operation time period of each of the operation modes is increased or decreased as appropriate as described below in accordance with a magnitude relationship between an actual relative humidity of the sucked air and the reference relative humidity, to thereby determine the operation time period of each of the operation modes.

The actual relative humidity of the sucked air is determined based on the state of the sucked air, which is obtained by the temperature-humidity sensor 50 at the start of the dehumidifying operation. When the relative humidity is higher than a preset relative humidity, an amount of the moisture released from the desiccant block 7 in the first operation mode is smaller than an amount of the moisture released therefrom when the relative humidity is equal to the reference relative humidity. Further, an amount of the moisture adsorbed into the desiccant block 7 in the second operation mode is larger than an amount of the moisture adsorbed thereinto when the relative humidity is equal to the reference relative humidity. Therefore, when the actual relative humidity of the sucked air is higher than the reference relative humidity, the operation time period of the first operation mode is set longer than the reference operation time period of the first operation mode, and in contrast, the operation time period of the second operation mode is set shorter than the reference operation time period of the second operation mode.

On the other hand, when the actual relative humidity of the sucked air is lower than the reference relative humidity, the amount of the moisture released from the desiccant block 7 in the first operation mode is larger than the amount of the moisture released therefrom when the relative humidity is equal to the reference relative humidity. Further, the amount of the moisture adsorbed into the desiccant block 7 in the second operation mode is smaller than the amount of the moisture adsorbed thereinto when the relative humidity is equal to the reference relative humidity. Therefore, when the actual relative humidity of the sucked air is lower than the reference relative humidity, the operation time period of the first operation mode is set shorter than the reference operation time period of the first operation mode, and in contrast, the operation time period of the second operation mode is set longer than the reference operation time period of the second operation mode.

Through the adjustment of the operation time period in each of the operation modes as described above, the amount of the moisture retained in the desiccant block 7 can appropriately be controlled, and regardless of the state of the sucked air, the high dehumidifying amount can always be realized. Note that, when the actual relative humidity of the sucked air is equal to the reference relative humidity, as a matter of course, the dehumidifier 1 only needs to be operated for the reference operation time period of each of the operation modes.

(Determination Method 2)

The operation time period of each of the operation modes is determined based on an operation state of the refrigerant circuit A at the start of the dehumidifying operation. Specific description is given below.

The operation state of the refrigerant circuit A fluctuates depending on the state of the sucked air. Specifically, when the relative humidity of the sucked air is high, a humidity difference between air before passing through the heat exchanger serving as the evaporator in each of the operation modes and air after passing therethrough is increased as compared to a case where the relative humidity of the sucked air is low. That is, heat exchange between refrigerant and air in the evaporator is promoted, and accordingly, an operation is performed in which a low-pressure-side pressure in the refrigeration cycle is increased. In contrast, when the relative humidity of the sucked air is low, the heat exchange between the refrigerant and the air in the evaporator is suppressed, and hence an operation is performed in which the low-pressure-side pressure in the refrigeration cycle is decreased.

The low-pressure-side pressure in the refrigeration cycle and the relative humidity of the sucked air have the above-mentioned relationship. Thus, through application of this relationship to Determination Method 1 described above, the operation time period of each of the first and second operation modes can be determined in accordance with the low-pressure-side pressure in the refrigeration cycle. Note that, a high-pressure-side pressure in the refrigeration cycle is also increased along with the increase in low-pressure-side pressure, and after all, the operation time period of each of the first operation mode and the second operation mode can be determined in accordance with the low-pressure-side pressure or the high-pressure-side pressure in the refrigeration cycle.

That is, the low-pressure-side pressure (or high-pressure-side pressure) in the refrigeration cycle is measured at the start of the dehumidifying operation, and a measured low-pressure value (or measured high-pressure value) obtained through the measurement and a preset low-pressure reference value (or high-pressure reference value) are compared with each other. When the measured low-pressure value (or measured high-pressure value) is higher than the low-pressure reference value (or high-pressure reference value), it is determined that the relative humidity of the sucked air is high. Similarly to Determination Method 1 described above, the operation time period of the first operation mode is set longer than the reference operation time period, and in contrast, the operation time period of the second operation mode is set shorter than the reference operation time period.

On the other hand, when the measured low-pressure value (or measured high-pressure value) is lower than the low-pressure reference value (or high-pressure reference value), it is determined that the relative humidity of the sucked air is low. Similarly to Determination Method 1 described above, the operation time period of the first operation mode is set shorter than the reference operation time period, and in contrast, the operation time period of the second operation mode is set longer than the reference operation time period.

Note that, when the low-pressure-side pressure and the high-pressure-side pressure are measured, the pressures may be measured by pressure sensors 70, 71 provided to a low-pressure portion and a high-pressure portion of the refrigeration cycle, or a temperature of refrigerant in each heat exchanger, which serves as a gas-liquid two-phase portion in the refrigeration cycle, may be measured to estimate the low-pressure-side pressure based on the temperature.

As described above, the amount of the moisture retained in the desiccant block 7 can appropriately be controlled also based on the low-pressure-side pressure and the high-pressure-side pressure in the refrigeration cycle similarly to Determination Method 1 described above (method based on information of the sucked air). The high dehumidifying amount can always be realized regardless of the state of the sucked air.

(Switching of Operation at Time of Frost Formation)

Incidentally, when the second operation mode is performed with sucked air having a low temperature, the first heat exchanger 4 cools low-temperature air. Therefore, when a temperature of fin surfaces in the first heat exchanger 4 becomes 0 degrees C. or less, frost is formed on the fin surfaces. When the operation is continued in the state as it is, the formed frost grows to block air flow passages between the fins. As a result, an air-sending amount is decreased, and thus the operation of the dehumidifier 1 cannot properly be performed.

In view of the above, when it is estimated that frost is formed in the first heat exchanger 4 based on the operation state of the refrigerant circuit A during the second operation mode, even before an end of a preset operation time period (or before an end of an operation time period determined in Determination Method 1 or Determination Method 2 described above), the second operation mode may be ended and switched to the first operation mode. Note that, in the first operation mode, the first heat exchanger 4 is operated as the condensor, and hence the refrigerant is high in pressure and temperature so that the formed frost can be heated to be melted.

A frost-formation state can be determined based on the low-pressure-side pressure in the refrigeration cycle. For example, when a time during which the low-pressure-side pressure is lower than a predetermined value is continued for a certain time period during the operation in the second operation mode, it is determined that a state in which the temperature of the fin surfaces of the first heat exchanger 4 is 0 degrees C. or less is continued for a long time period, and the frost formation is progressed. In this case, as described above, the second operation mode is ended and switched to the first operation mode. Note that, as a measurement method for the low-pressure-side pressure, similarly to the above-mentioned measure, the pressure sensor 71 may be provided to the low-pressure portion of the refrigeration cycle, or the temperature of the refrigerant in the first heat exchanger 4, which is low in pressure and serves as the gas-liquid two-phase portion, may be measured.

Note that, the determination for the frost-formation state is not limited to the above-mentioned method. The temperature itself of the fin surfaces of the first heat exchanger 4 may be measured, and when the operation is continued for a certain time period at the temperature of 0 degrees C. or less, the state may be determined as the frost-formation state.

As described above, when the determination as the frost-formation state is made in the second operation mode, through the switching to the first operation mode, the dehumidifier 1 is not operated with the frost-formation state being progressed any more, thereby realizing a more reliable dehumidifier 1 that avoids the decrease in dehumidifying amount caused by the decrease in air-sending amount.

As the refrigerant for the dehumidifier 1, as described above, besides R410A, another HFC-based refrigerant, HC refrigerant, or natural refrigerant such as $CO_2$ or $NH_3$ can be used. As the refrigerant for the dehumidifier 1, besides these refrigerants, R32 having a higher gas specific heat ratio than that of R410A may also be used. When R32 is used as the refrigerant, heating capacity when the refrigerant is used as a hot gas for defrosting can be enhanced so that frost and ice formed in the first heat exchanger 4 or the second heat exchanger 6 can be melted in an early stage. Note that, the above-mentioned effects can be obtained not only in the case where R32 is used as the refrigerant, but, for example, also in the case where a refrigerant mixture of R32 and HFO123yf having a higher gas specific heat ratio than that of R410A is used, the heating capacity when the refrigerant is used as the hot gas can similarly be enhanced so that the frost and the ice formed in the first heat exchanger 4 or the second heat exchanger 6 can be melted in an early stage.

Further, when R32 is used as the refrigerant, the defrosting for the formed frost can be ended in an early stage so that desorption reaction of the air flowing into the desiccant block 7 in the first operation mode can be started in an early stage. Therefore, a rate of a time during which the dehumidifying amount is increased can be increased, and hence an operation time period required to reach a target dehumidifying amount is shortened, thereby attaining energy saving.

Note that, in the above-mentioned embodiments, the relative humidity of the sucked air is determined based on the state of the sucked air, which is obtained by the temperature-humidity sensor 50. However, another sensing unit may be employed as long as the sensing unit is a device that can estimate the relative humidity. For example, a sensor for directly measuring the relative humidity or unit for estimating the relative humidity based on a dew-point temperature measured by a sensor may be employed. The temperature-humidity sensor 50 functions as a state-detection device of the present invention. Further, the detection sensors used for measuring the low-pressure-side pressure and the high-pressure-side pressure each also correspond to the state-detection device of the present invention as described above.

REFERENCE SIGNS LIST

1 dehumidifier, 2 compressor, 3 four-way valve, 4 first heat exchanger, 5 pressure reducing unit, 5a electronic expansion valve, 5b first element, 5c second element, 5d third element, 5e first element, 5f second element, 5g third element, 5h fourth element, 6 second heat exchanger, 7 desiccant block, 8 fan, 10 housing, 11 wall surface, 20 air passage chamber, 20a air inlet (air inlet/outlet), 20b air outlet (air inlet/outlet), 30 machine chamber, 40 drain pan, 41 water passage, 42 drain tank, 50 temperature-humidity sensor, 51 first flow passage, 52 second flow passage, 53 first flow passage, 54 second flow passage, 60 controller, 70 pressure sensor, 71 pressure sendor, A refrigerant circuit, and B air passage.

The invention claimed is:
1. A dehumidifier comprising:
a refrigerant circuit configured to circulate refrigerant and sequentially connecting a compressor, a flow switching device, a first heat exchanger, an electronic expansion valve having a changeable pressure reducing amount, and a second heat exchanger to each other by refrigerant pipes;
an air passage in which the first heat exchanger, a desiccant block consisting of a desiccant material capable of adsorbing and desorbing moisture, and the second heat exchanger are arranged in series; and a fan arranged in the air passage and configured to cause air existing in space to be dehumidified to flow through the air passage;

the dehumidifier being configured to perform a dehumidifying operation including a first operation mode in which the first heat exchanger is operated as a condensor or a radiator to desorb the moisture retained in the desiccant material, and the second heat exchanger is operated as an evaporator so that a refrigerant temperature in the second heat exchanger is lower than a dew-point temperature of air passing through the second heat exchanger and to maximize a dehumidified amount of moisture removed from air passing through the second heat exchanger, and a second operation mode in which the first heat exchanger is operated as the evaporator so that a refrigerant temperature in the first heat exchanger is lower than a dew-point temperature of air passing through the first heat exchanger and to cause the desiccant material to adsorb moisture from air passing through the air passage and to maximize a dehumidified amount of moisture removed from air passing through the first heat exchanger and through the desiccant material, and the second heat exchanger is operated as the condensor or the radiator, the first operation mode and the second operation mode being alternately switched through switching of a flow passage by the flow switching device, and the dehumidifying operation being performed so that a pressure reducing amount in the electronic expansion valve in the first operation mode is smaller than a pressure reducing amount in the electronic expansion valve in the second operation mode.

2. The dehumidifier of claim 1, wherein the electronic expansion valve is an electronic expansion valve being variably controllable in its pressure reducing amount.

3. The dehumidifier of claim 1,
wherein the electronic expansion valve has a configuration in which a first flow passage and a second flow passage are connected in parallel,
wherein the first flow passage includes a first element and a second element arranged in series, the first element being constructed by a capillary tube or an expansion valve fixed in its opening degree, the second element being constructed by a check valve or an openable/closable valve configured to cause the refrigerant to flow through the first element of the first flow passage only in the first operation mode, and
wherein the second flow passage includes a third element constructed by a check valve or an openable/closable valve.

4. The dehumidifier of claim 1,
wherein the electronic expansion valve has a configuration in which a first flow passage and a second flow passage are connected in parallel,
wherein the first flow passage includes a first element and a second element arranged in series, the first element being constructed by a thermal expansion valve, the second element being constructed by a check valve or an openable/closable valve configured to cause the refrigerant to flow through the first element of the first flow passage only in the first operation mode, and wherein the second flow passage includes a third element and a fourth element arranged in series, the third element being constructed by a thermal expansion valve, the fourth element being constructed by a check valve or an openable/closable valve configured to cause the refrigerant to flow through the third element of the second flow passage only in the second operation mode.

5. The dehumidifier of claim 1, wherein the refrigerant is refrigerant having a higher gas specific heat ratio than a gas specific heat ratio of R410A.

6. The dehumidifier of claim 1, further comprising a state-detection device selected from a temperature-humidity sensor, a pressure sensor and a temperature sensor configured to detect a state of a sucked air sucked into the air passage from the space to be dehumidified,
wherein an operation time period of the first operation mode and an operation time period of the second operation mode are each determined based on the state detected by the state-detection device.

7. The dehumidifier of claim 6,
wherein the state-detection device is the temperature-humidity sensor which is configured to detect a relative humidity,
wherein a reference operation time period of the first operation mode and a reference operation time period of the second operation mode when a relative humidity of the sucked air is equal to a preset reference relative humidity are preset,
wherein, when the relative humidity of the sucked air, which is detected by the temperature-humidity sensor at a start of the dehumidifying operation, is higher than the preset reference relative humidity, the operation time period of the first operation mode is set longer than the reference operation time period of the first operation mode, and the operation time period of the second operation mode is set shorter than the reference operation time period of the second operation mode, and
wherein, when the relative humidity of the sucked air, which is detected by the temperature-humidity sensor at the start of the dehumidifying operation, is lower than the preset reference relative humidity, the operation time period of the first operation mode is set shorter than the reference operation time period of the first operation mode, and the operation time period of the second operation mode is set longer than the reference operation time period of the second operation mode.

8. The dehumidifier of claim 1, further comprising a detection sensor selected from a pressure sensor and a temperature sensor configured to detect an operation state of the refrigerant circuit,
wherein an operation time period of the first operation mode and an operation time period of the second operation mode are each determined based on the operation state detected by the detection sensor.

9. The dehumidifier of claim 8,
wherein the detection sensor is configured to detect a low-pressure-side pressure or a high-pressure-side pressure in the refrigerant circuit,
wherein, when the low-pressure-side pressure or the high-pressure-side pressure detected by the detection sensor at a start of the dehumidifying operation is higher than corresponding one of a predetermined low-pressure reference value and a predetermined high-pressure reference value, the operation time period of the first operation mode is set longer than a reference operation time period of the first operation mode, and the operation time period of the second operation mode is set shorter than a reference operation time period of the second operation mode, and wherein, when the low-pressure-side pressure or the high-pressure-side pressure detected by the detection sensor at the start of the dehumidifying operation is lower than corresponding one of the predetermined low-pressure reference value and the predetermined high-pressure reference value, the operation time period of the first operation mode is set shorter than the reference operation time period of the first operation mode, and the operation time period of the second operation mode is set longer than the reference operation time period of the second operation mode.

10. The dehumidifier of claim 1, wherein the first operation mode and the second operation mode are switched every preset time period.

11. The dehumidifier of claim 1, further comprising a frost-formation detection device selected from a pressure sensor and a temperature sensor configured to detect frost formation in the first heat exchanger, wherein, when the frost formation is detected by the frost-formation detection device during the second operation mode, the second operation mode is switched to the first operation mode even before an original end time of an operation time period of the second operation mode.

12. The dehumidifier of claim 1, wherein
in the first operation mode, a temperature of air passing through the desiccant block is reduced, and
in the second operation mode, the temperature of air passing through the desiccant block is increased.

13. The dehumidifier of claim 1,
wherein the desiccant block is a member selected from the group consisting of silica gel and polymer-based adsorbent.

14. The dehumidifier of claim 1, further comprising temperature sensors configured to detect an operation state of the refrigerant circuit, wherein the pressure reducing amount in the electronic expansion valve in the first operation mode is based on a refrigerant temperature difference between an inlet and an outlet of the second heat exchanger, and the pressure reducing amount in the electronic expansion valve in the second operation mode is based on a refrigerant temperature difference between an inlet and an outlet of the first heat exchanger.

15. A dehumidifier comprising:
a refrigerant circuit configured to circulate refrigerant and sequentially connecting a compressor, a flow switching device, a first heat exchanger, an electronic expansion valve having a controllable and variable pressure reducing amount, and a second heat exchanger to each other by refrigerant pipes;
an air passage in which the first heat exchanger, a desiccant block consisting of a desiccant material capable of adsorbing and desorbing moisture, and the second heat exchanger are arranged in series; and
a fan arranged in the air passage and configured to cause air existing in space to be dehumidified to flow through the air passage; and
a controller configured to control a dehumidifying operation of the dehumidifier including alternating between a first operation mode in which the first heat exchanger is configured to operate as a condensor or a radiator and to desorb the moisture retained in the desiccant material, and the second heat exchanger is configured to operate as an evaporator at a refrigerant temperature lower than a dew-point temperature of air passing through the second heat exchanger and to maximize a dehumidified amount of moisture removed from air passing through the second heat exchanger, and a second operation mode in which the first heat exchanger is configured to operate as the evaporator at a refrigerant temperature lower than a dew-point temperature of air passing through the first heat exchanger and to dehumidify air passing through the first heat exchanger and to cause the desiccant material to adsorb moisture from air passing through the air passage and to maximize a dehumidified amount of moisture removed from air passing through the first heat exchanger and through the desiccant material, and the second heat exchanger is operated as the condensor or the radiator, wherein during the dehumidifying operation, the controller is configured
to switch the flow switching device and alternate between a flow passage for the first operation mode and a flow passage for the second operation mode, and
to control a pressure reducing amount in the electronic expansion valve in the first operation mode to be smaller than a pressure reducing amount in the electronic expansion valve in the second operation mode.

16. The dehumidifier of claim 15
wherein the electronic expansion valve has a configuration in which a first flow passage and a second flow passage are connected in parallel,
wherein the first flow passage includes a first element and a second element arranged in series, the first element being constructed by a capillary tube or an expansion valve fixed in its opening degree, the second element being constructed by a check valve or an openable/closable valve configured to cause the refrigerant to flow through the first element of the first flow passage only in the first operation mode, and
wherein the second flow passage includes a third element constructed by a check valve or an openable/closable valve.

17. The dehumidifier of claim 15,
wherein the desiccant block is a member selected from the group consisting of silica gel and polymer-based adsorbent.

18. The dehumidifier of claim 15, further comprising temperature sensors configured to detect an operation state of the refrigerant circuit,
wherein the pressure reducing amount in the electronic expansion valve in the first operation mode is based on a refrigerant temperature difference between an inlet and an outlet of the second heat exchanger, and the pressure reducing amount in the electronic expansion valve in the second operation mode is based on a refrigerant temperature difference between an inlet and an outlet of the first heat exchanger.

* * * * *